Patented Nov. 28, 1950

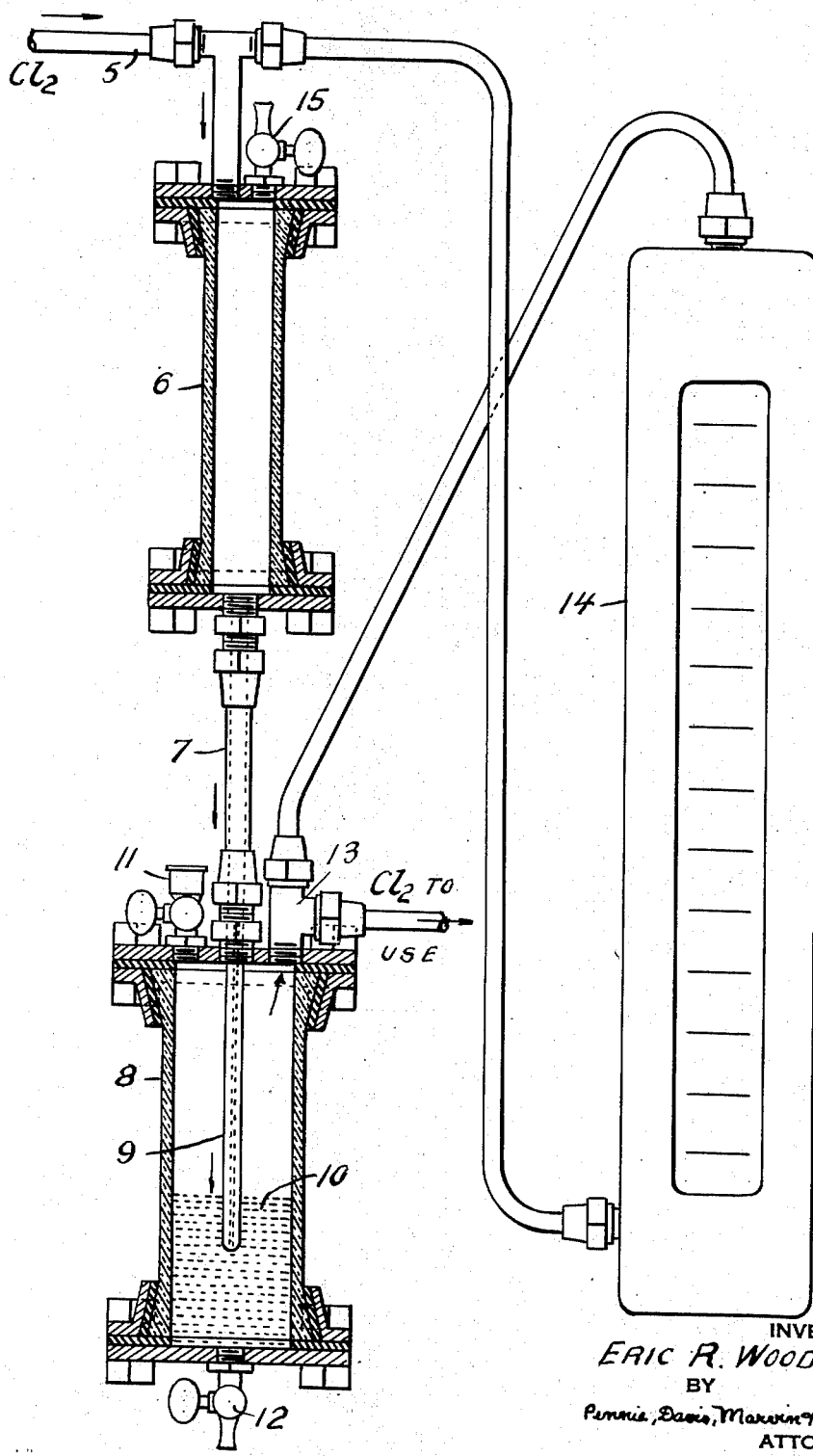

2,532,218

UNITED STATES PATENT OFFICE 2,532,218

SELF-CLEANING CAPILLARY TUBE TYPE FLOWMETER

Eric R. Woodward, New York, N. Y., assignor to Mathieson Chemical Corporation, a corporation of Virginia Application December 3, 1945, Serial No. 632,335

3 Claims. (Cl. 73—211)

The present invention relates to fluid flow meters of the orifice type and, more particularly, to orifice type flow meters wherein the orifice comprises a capillary tube through which the fluid flows in passing through the meter.

It is common practice to measure the rate of fluid flow through a pipe by measuring the drop in pressure caused by the insertion in the pipe of a sharply restricted opening or flow restrictor. One such flow restrictor type of fluid flow meter is described in my abandoned application Serial No. 527,407 filed March 21, 1944. In the fluid flow meter described therein, the flow restrictor is provided by a capillary tube interposed in the path of the fluid flowing through the meter. The drop in pressure may be measured, for example, by using a manometer such as that of the U-tube type, having one arm connected to the pipe on the upstream side of the flow restrictor and having the other arm connected to the pipe on the downstream side of the flow restrictor. As the rate of fluid flow through the pipe varies, the pressure differential will also vary and will be indicated, for example, by the manometer.

The calibration of a fluid flow meter of the flow restrictor type depends upon the size of the flow restrictor, or capillary tube opening. Once such a meter is calibrated, its continued accuracy depends upon maintenance of the flow restrictor at a constant size.

Numerous gaseous fluids tend to leave a deposit, frequently of a gummy nature, on the surfaces with which they are in contact. This is true, for example, of chlorine. As the flow of chlorine through the capillary tube of a fluid flow meter continues, a gummy deposit tends to form on the inner surface of the capillary tube. Regardless of the specific fluid passing through the meter, or of the cause of formation of such a deposit, the mere presence of any foreign deposit in the flow restrictor adversely affects the accuracy of the calibration of the meter.

The formation of such a foreign deposit in the flow restrictor of a gaseous fluid flow meter is substantially prevented in accordance with the present invention by providing a body of cleaning liquid in contact with the downstream or discharge end of the flow restrictor. In the type of fluid flow meter wherein the flow restrictor comprises a capillary tube through which the fluid flows in passing through the meter and wherein the discharge end of the tube extends into a chamber interposed in the path of fluid flow, the body of cleaning liquid is provided within the chamber so as to enclose the discharge end of the capillary tube. Thus, when the fluid flow is terminated, the cleaning liquid enters into the capillary tube and removes any deposit which may have formed on the interior surface of the capillary tube. The flow meter is thus self-cleaning. A second chamber may with advantage be interposed in the path of fluid flow on the upstream side of the capillary tube to trap liquid drawn up into the tube upon termination of the fluid flow and thus prevent its backing up into the main fluid supply line. Accordingly, my invention provides a method of preventing the formation of an appreciable deposit of foreign material in the flow restrictor of a gaseous fluid flow meter of the flow restrictor type by submerging the flow restrictor, such as the discharge end of a capillary tube, in a body of cleaning liquid whereby the liquid flows into the flow restrictor upon termination of the flow of fluid through the meter.

In order to illustrate my invention, I shall refer to a simple apparatus particularly adapted to the handling of chlorine gas. It is desirable that the portions of the apparatus in contact with the fluid be constructed of materials adapted to withstand any corrosive tendency of the fluid. The specific materials referred to in the following description have been found to be especially suited to the handling of chlorine gas. It will be understood, however, that the invention is not limited to any specific material or to the specific well-type manometer illustrated herein as the means of indicating pressure differentials. Other pressure indicating instruments, such as valve-actuated instruments and others well known in the art, may be used in accordance with the invention.

A specific embodiment of the apparatus of my invention is illustrated in the drawing in which the figure is an elevation view, partly in section, of a self-cleaning fluid flow meter including a manometer.

The apparatus illustrated in the drawing is particularly adapted to measure fluid flow of chlorine gas from a source of such gas to a chlorine dioxide generator. As seen in the figure, the chlorine supply line 5 is connected into the top of a liquid trap 6. The trap consists of a glass cylinder having flared ends to which are secured suitable feeding heads. The chlorine passes from the bottom of the liquid trap 6 through a silver tube 7 connected to the top of a flow restrictor chamber 8. A glass capillary tube 9 is sealed into the end of the silver tube and projects into the interior of chamber 8. Chamber 8, which is made of glass with suitable feeding heads at the top and bottom, contains a body of cleaning liquid 10 having a liquid level such as to enclose or immerse the discharge end of capillary tube 9. The liquid level within chamber 8 may be maintained, or the liquid may be in part or completely replaced, by means of a charging pet cock 11 in the upper head of the chamber and a drain pet cock 12 in the bottom of the chamber. Thus, chlorine gas discharged through the flow restrictor or capillary tube 9 passes through the liquid 10 and into the upper part of chamber 8 from which it is discharged through line 13 for use in a chlorine dioxide generator.

The pressure differential between the chlorine gas in the supply line 5 and the reduced pressure chlorine flowing through discharge line 13 is measured by connecting the reduced pressure discharge line 13 to the top of a well-type manometer 14 and by connecting the relatively high pressure chlorine supply line 5 to the well at the bottom of the manometer.

In normal operation of the flow meter, chlorine from the supply line 5 passes through the liquid trap 6, tube 7 and capillary tube 9 from which it is discharged through the body of cleaning liquid 10 into chamber 8. The chlorine gas, discharged from the capillary tube at reduced pressure with respect to the pressure in the chlorine supply line, is removed through line 13 for use as required. When the flow of chlorine through the meter is terminated, the cleaning liquid in chamber 8 flows into the capillary tube 9, either by the capillary action of the tube itself or by a positive pressure differential on the discharge end of the capillary tube. For example, it is generally the practice to bleed chlorine out of the chlorine supply line when the chlorine dioxide generator is shut down in such a system. Under certain operating conditions the pressure in the chlorine supply line after it is bled and the pressure in the chlorine discharge line 13 may be substantially equal so that capillary action alone draws the cleaning liquid 10 into the capillary tube. On the other hand, the operation may be such that the pressure in the chlorine line after it is bled is less than the pressure in the chlorine dioxide generator in which case the positive pressure on the discharge end of the capillary tube forces the cleaning liquid through the capillary tube and into the liquid trap. By making the liquid trap 6 of transparent material such as glass, the back pressure from the chlorine dioxide generator may be controlled so that liquid forced up into the trap is not forced back into the chlorine supply line. The cleaning liquid containing the deposit removed from the interior of the flow restrictor or capillary tube may be forced out of the liquid trap and capillary tube by supplying air or other gas under pressure through pet cock 15 in the liquid trap 6.

The cleaning liquid contained in chamber 8 may be any fluid which does not itself tend to form or leave a deposit on the interior of the capillary tube and which has a cleaning or solvent action on the deposit left by the fluid flowing through the orifice. It is presently preferred to use a cleaning liquid which has a solvent affinity for the deposit so as to produce a substantially clear solution of the deposit free from suspended particles of the deposit. However, the liquid may with advantage have a cleaning effect by loosening the bond between the deposit and the interior surface of the orifice so as to produce a suspension of the freed deposit in the cleaning liquid. The term "cleaning liquid" as used herein and in the claims comprises any such liquid having either a solvent action on the deposit or a bond-loosening action which frees the deposit for removal in suspension in the liquid. In either case, the deposit is taken up by the cleaning liquid and is removed with the liquid.

Thus, for example, in measuring the flow of chlorine gas, I have found it especially advantageous to use water or carbon tetrachloride as the cleaning liquid contained in chamber 8. However, other cleaning liquids may be used when metering chlorine gas, and the same or other cleaning liquids may be used in metering other fluids, depending of course on the nature of the deposit left by such fluid on the interior of the flow restrictor. If the choice of cleaning liquid is such that the fluid flowing through the meter carries out with it either vapors or entrained droplets of the cleaning liquid, such vapor or entrained droplets may be removed if necessary by any suitable means before the metered fluid is used for its intended purpose.

My present invention provides an improved fluid flow meter of the flow restrictor type characterized by stability of calibration and provides a method of cleaning the flow restrictor of a fluid flow meter so as to maintain a flow restrictor of constant size and hence of stable calibration. It is applicable to flow meters having only a single flow restrictor or capillary tube as well as to flow meters having a plurality of capillary tubes of the same or different capacities as described in my above-identified application.

I claim:

1. A gaseous fluid flow meter comprising a gas impervious chamber adapted to be partially filled to a predetermined level with a liquid, a capillary tube extending downwardly into said chamber and terminating therein beneath the liquid level, an inlet conduit leading to the upper end of said capillary tube and adapted to be connected with a source of the gas to be measured, a gas outlet leading from the chamber at a point above the liquid level and a pressure differential indicator connected across the capillary tube.

2. A gaseous fluid flow meter comprising a gas impervious chamber adapted to be partially filled to a predetermined level with a liquid, a capillary tube extending downwardly into said chamber and terminating therein beneath the liquid level, an inlet conduit leading to the upper end of said capillary tube and adapted to be connected with a source of the gas to be measured, a gas outlet leading from the chamber at a point above the liquid level, a pressure differential indicator connected across the capillary tube and an enlarged chamber interposed in the inlet conduit and adapted to trap any liquid which may pass upwardly through the capillary tube.

3. A gaseous fluid flow meter comprising a gas impervious chamber adapted to be partially filled to a predetermined level with a liquid, a capillary tube extending downwardly into said chamber and terminating therein beneath the liquid level, an inlet conduit leading to the upper end of said capillary tube and adapted to be connected with a source of the gas to be measured, a gas outlet leading from the chamber at a point above the liquid level and a manometer tube connected across the capillary tube.

ERIC R. WOODWARD.

REFERENCES CITED

The following references are of record in the file of this patent:

UNITED STATES PATENTS

| Number | Name | Date |
|---|---|---|
| 1,347,143 | Brown | July 20, 1920 |
| 1,923,044 | Baker | Aug. 15, 1933 |
| 2,333,791 | Hutchison | Nov. 9, 1943 |

FOREIGN PATENTS

| Number | Country | Date |
|---|---|---|
| 194,921 | Great Britain | Mar. 22, 1923 |